United States Patent [19]

Erschens et al.

[11] Patent Number: 5,184,806
[45] Date of Patent: Feb. 9, 1993

[54] JACK

[75] Inventors: Willie Erschens, Waldweiler; Franz J. Mencher, Mandern; Peter Brosius, Ayl; Klaus Grave, Ennepetal; Bernhard Zender, Waldweiler; Peter Schardt, Neunkirchen; Gerd Hessek, Wadern-Lockweiler; Ferdinand Alten, Mandern, all of Fed. Rep. of Germany

[73] Assignee: August Bilstein GmbH & Co. KG, Ennepetal, Fed. Rep. of Germany

[21] Appl. No.: 859,098

[22] Filed: Mar. 27, 1992

[30] Foreign Application Priority Data

Apr. 30, 1991 [DE] Fed. Rep. of Germany ....... 4114129

[51] Int. Cl.⁵ .............................................. B66F 3/12
[52] U.S. Cl. ................... 254/126; 411/433; 411/908

[58] Field of Search ................. 254/122, 124, 126; 411/433, 276, 278, 279, 937.2, 908; 74/441

[56] References Cited

U.S. PATENT DOCUMENTS 3,989,225 11/1976 Keilholz ............................ 254/126
4,657,458 4/1987 Woller et al. ..................... 411/433

Primary Examiner—Robert C. Watson
Attorney, Agent, or Firm—Max Fogiel

[57] ABSTRACT

A jack (1) has a flat base (2) attached to a support (3) at the top by a lever-operated mechanism. The mechanism is activated by a threaded shaft (5) and nut (6). The nut has a coaxial gudgeon (10 & 11) on each side. The gudgeons extend across the axis (22) of an interior-threaded section. The nut consists of two halves (13 & 14). The halves fit together at a flat interface (15). The interface parallels both the axis (21) of the gudgeons and the axis (22) of the threaded section (23).

11 Claims, 4 Drawing Sheets

JACK

BACKGROUND OF THE INVENTION

The invention concerns a jack with a flat base and a support at the top. The lift in a jack of this type is exerted by a lever-operated mechanism in conjunction with a threaded shaft and nut. German 8 716 609 Ul discloses such a jack. A drawback is that the nut must be screwed far onto the shaft when the device is assembled.

SUMMARY OF THE INVENTION

The object of the present invention is an improved nut that will simplify assembly without detriment to function, especially to the efficient transmission of forces.

The major advantage of the invention is the simplicity with which the nut can be mounted on the shaft. Since it is in two parts, it only has to be put together anywhere needed along the shaft. It is of advantage for the shaft to be previously lubricated with an oil or grease that will also prevent corrosion. Furthermore, the mounted nut will no longer have to be turned out of the way to lubricate any section of the shaft. The embodiment of the nut in two articulated parts simplifies assembly even more because the two parts are already positioned and need only be pivoted together. Another advantage is that two-part nuts are either to manufacture than one-part nuts because the threading tool does not have to be screwed out of the finished part. The result, whether cast, punched, sintered, or machined, will take substantially less time to make, and its threads will be as accurate or more accurate.

Nuts that are cast in two parts are also more practical than those cast in one part because they can be thinner, which means fewer bubbles and less shrinkage.

To reduce stress and strain on such a nut, which is preferably made of plastic, the two parts can be secured together by sleeves or wires.

BRIEF DESCRIPTION OF THE DRAWINGS

One embodiment of the invention will now be specified with reference to the drawing, wherein.

DESCRIPTION OF THE PREFERRED EMBODIMENTS

Figure 1:
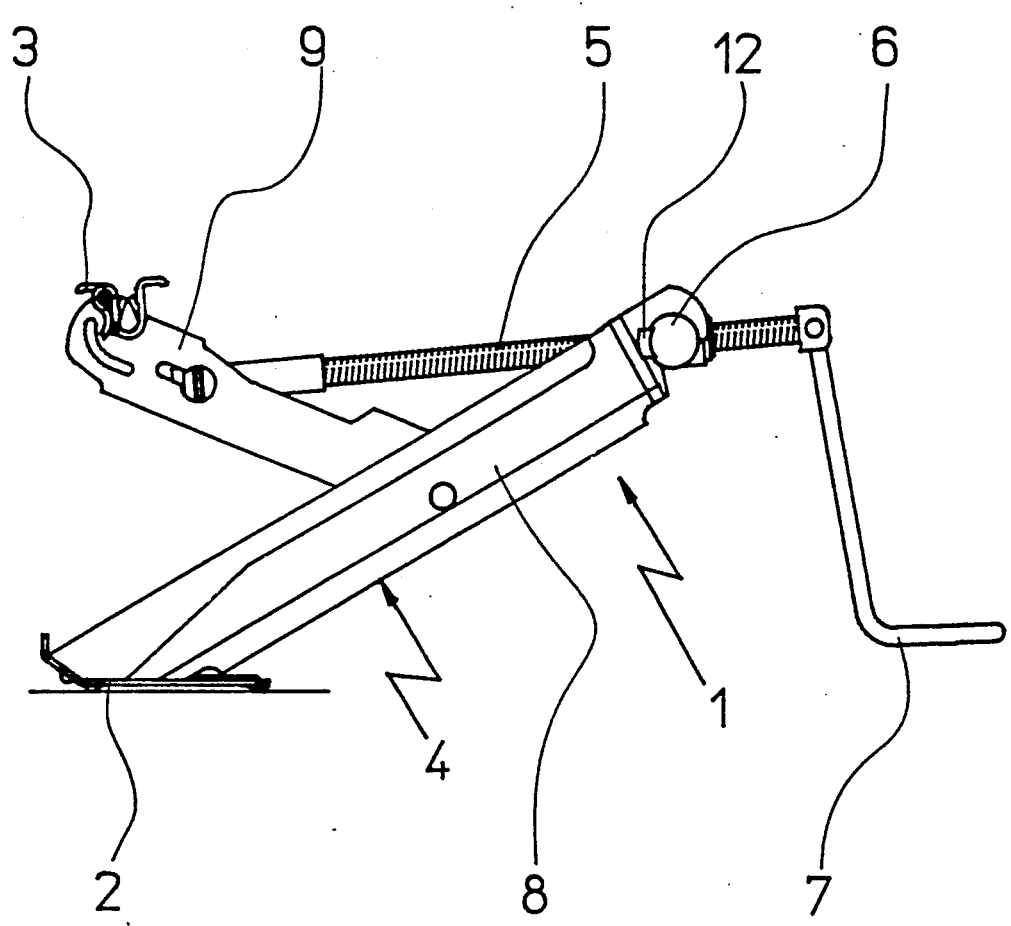
FIG. 1 is an overall view of a jack.

FIG. 1 illustrates a jack 1 with a flat base 2 and a support 3 at the top. The base and support are incorporated into a lever-operated mechanism 4 activated by a threaded shaft 5 and nut 6. A crank 7 rotates the shaft. The lever-operated mechanism in the illustrated embodiment is in the form of a leg 8 and arm 9. The jack is accordingly of the familiar pivoting-arm type. The invention can, however, also be employed in jacks that operate on the parallelogram or scissoring principles.

Shaft 5 and nut 6 are loosely articulated to arm 9 and leg 8. The nut is articulated to the leg by way of lateral gudgeons 10 and 11 that fit into matching depressions 12 in the leg.

Figure 2:
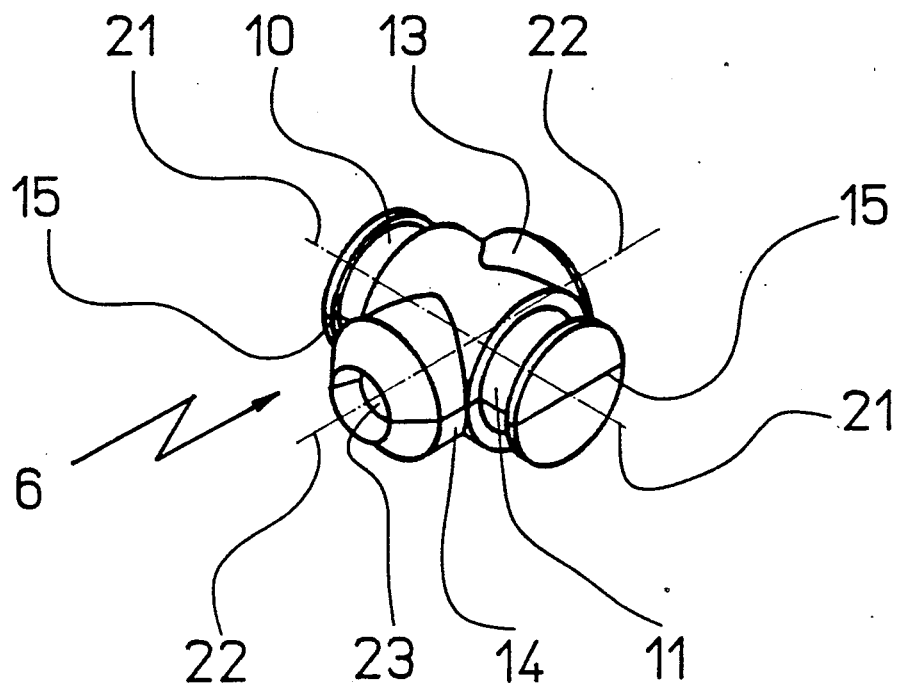
FIG. 2 illustrates a nut.
Figure 3:
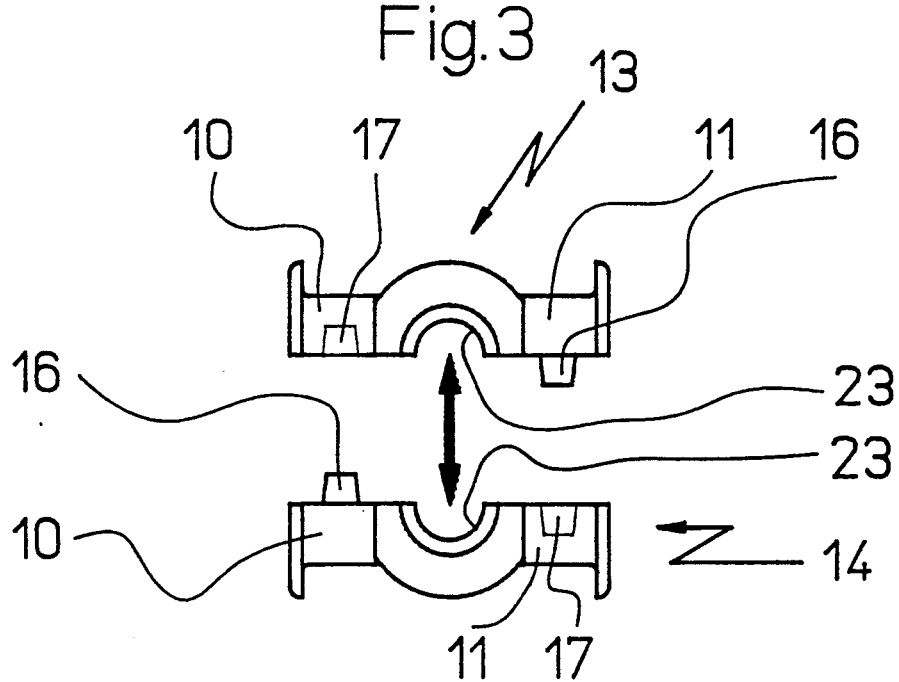
FIG. 3 illustrates a nut secured together with pins.

As will be evident from FIGS. 2 and 3, nut 6 consists of two halves 13 and 14 that meet at a flat interface 15. The two halves in the embodiment illustrated in FIG. 3 are identical in shape and each has a pin 16 that fits into a matching depression 17, securing the two haves once they have been joined. This approach positions halves 13 and 14 together.

Figure 4:
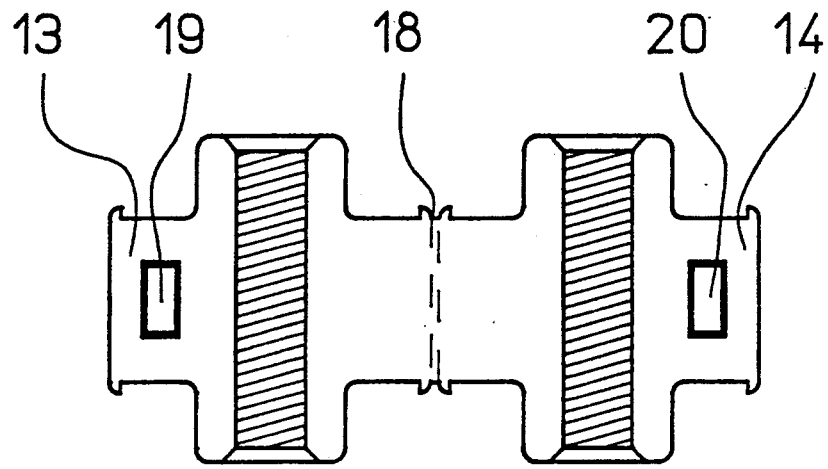
FIG. 4 illustrates a single nut comprising two articulated halves.
Figure 5:
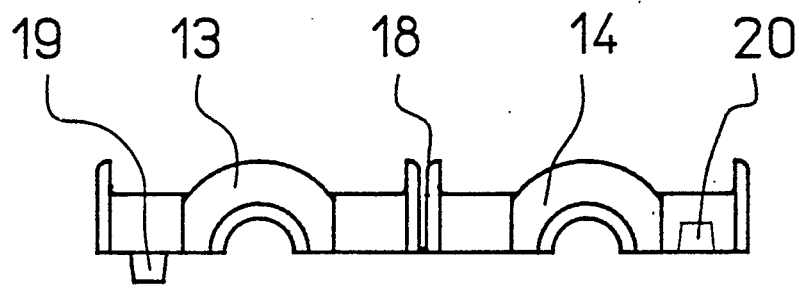
FIG. 5 is a view of the nut illustrated in FIG. 4.
Figure 6:
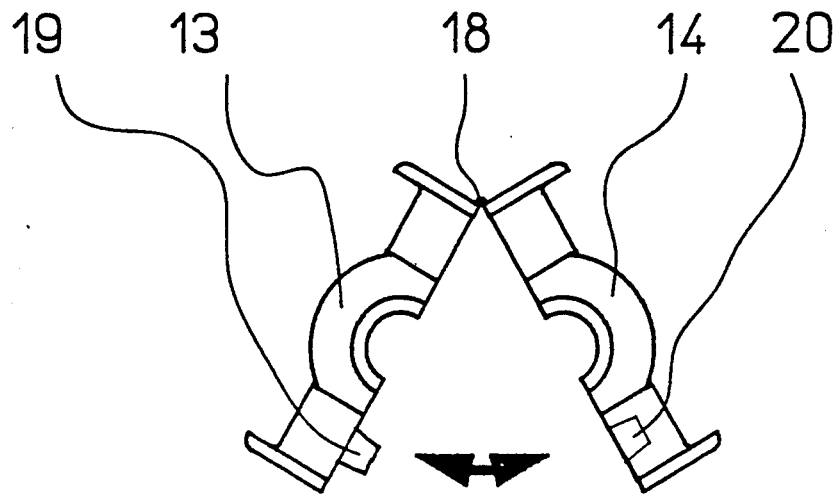
FIG. 6 illustrates how the nut illustrated in FIGS. 4 and 5 fits together.
Figure 7:
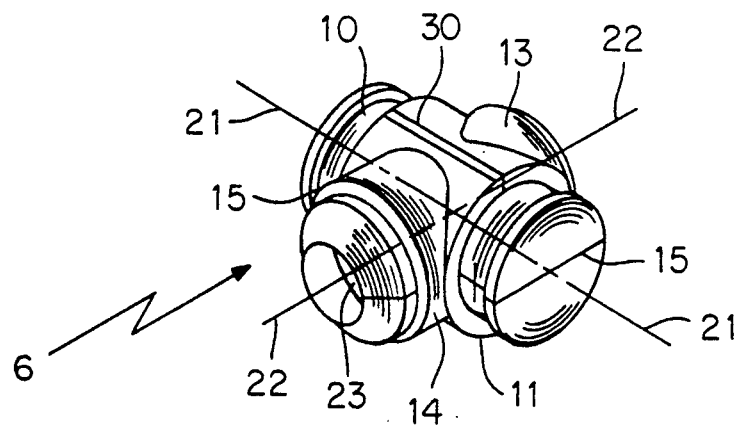
FIG. 7 is a perspective view of the nut and a device for holding the halves of the nut together.
Figure 8:
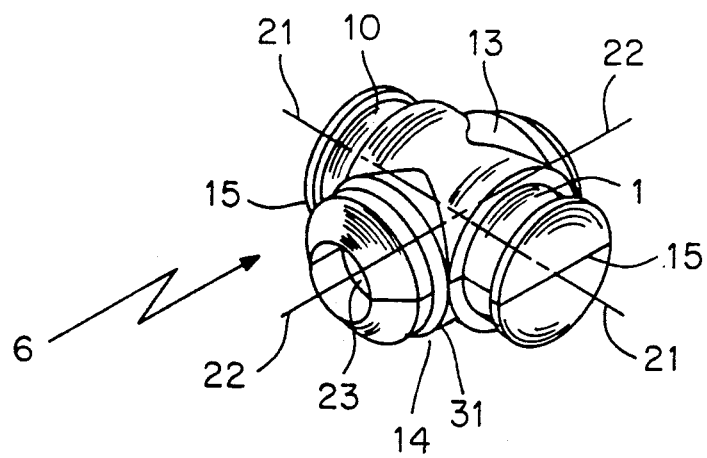
FIG. 8 is a perspective view of another embodiment of FIG. 7 for holding the halves of the nut together.

The nut 6 illustrated in FIGS. 4 through 6 is in one piece. Halves 13 and 14 are connected at an articulation 18. The articulation in the illustrated example is a section thin enough and accordingly flexible enough to allow flection of 180°. The meeting surfaces of nut 6 are provided with one pin 19 and one matching depression 20.

The interface 15 between halves 13 and 14 parallels both the axis 21 of gudgeons 10 and 11 and the axis 22 of threaded section 23. Since there is no parallel displacement between axes 21 and 22 and interface 15, they will coincide with the interface.

The halves 13 and 14 of the nut 6 may also be secured together by sleeves 30 that fit over the gudgeons 10 and 11 and/ or the outer surface of the threaded section 23.

In another embodiment, the halves 13 and 14 of the nut 6 may be secured together by wires 31 that fit at least part way around the gudgeons 10 and 11 and/or the outer surface of the threaded section 23.

We claim:

1. A jack with a base element and a support head; lever means connecting said base element and said support head; a threaded shaft and nut connected to said lever means for actuating said lever means: said nut having two half parts lying together at a connecting interface plane, said threaded shaft having a longitudinal axis; a gudgeon on each of two sides of said nut and having a common axis extending across the axis of said threaded shaft; said interface plane lying parallel to said common axis of the gudgeons and said axis of said shaft; said lever means holding said nut and surrounding said interface plane during operation of said jack to a maximum load carrying position so that said parts of said nut are pressed together at said interface plane with a force that increases with increase in load carried by the jack for holding said two parts securely and tightly together when said jack carries a load.

2. A jack as defined in claim 1, wherein said common axis of said gudgeons and said axis of said threaded shaft lie in said interface plane.

3. A jack as defined in claim 1, including at lest one pin in one half part of said nut and at least one depression in the other half part of said nut for receiving said pin to position said parts of said nut together.

4. A jack as defined in claim 1, including hinge means for connecting said two half parts of said nut.

5. A jack as defined in claim 4, wherein said half parts of said nut and said hinge means are of the same piece of flexible material.

6. A jack as defined in claim 5, wherein said flexible material comprises flexible plastic.

7. A jack as defined in claim 1, including sleeve means on said half parts of said nut and fitting over sad gudgeons for holding together said half parts of said nut.

8. A jack as defined in claim 1, wherein said half parts of said nut have threaded sections; and sleeve means fitting over said threaded sections for holding together said half parts of said nut.

9. A jack as defined in claim 1, including wire means fitting at lest partly about said gudgeons for holding together said half parts of said nut.

10. A jack as defined in claim 1, wherein said half parts of said nut have threaded sections; and wire means fitting at least partly about an outer surface of said threaded sections.

11. A jack with a base element and a support head; lever means connecting said base element and said support head; a threaded shaft and nut connected to said lever means for actuating said lever means; said nut having two half parts lying together at a connecting interface plane, said threaded shaft having a longitudinal axis; a gudgeon on each of two sides of said nut and having a common axis extending across the axis of said threaded shaft; said interface plane lying parallel to said common axis of the gudgeons and said axis of said shaft; said lever means holding said nut and surrounding said interface plane during operation of said jack to a maximum load carrying position so that said parts of said nut are pressed together at said interface plane with a force that increases with increase in load carried by the jack for holding said two parts securely and tightly together when said jack carries a load; said common axis and said axis of said threaded shaft lying in said interface plane; hinge means for connecting together said half parts of said nut; at least one pin in one half of said nut and a depression in the other half part of said nut for receiving said pin to position together said half parts of said nut; said half parts of said nut and said articulation being of the same piece of flexible plastic; sleeve means fitting over said gudgeons for holding together said half parts of said nut.

* * * * *